(12) United States Patent
Hong et al.

(10) Patent No.: US 12,106,244 B2
(45) Date of Patent: Oct. 1, 2024

(54) METHOD FOR DETERMINING A PROJECT FLOW, ELECTRONIC DEVICE, AND STORAGE MEDIUM

(71) Applicant: Beijing Zitiao Network Technology Co., Ltd., Beijing (CN)

(72) Inventors: Tao Hong, Beijing (CN); Dian Xiong, Beijing (CN); Chen Wang, Beijing (CN); Linxuan Shi, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/525,120

(22) Filed: Nov. 30, 2023

(65) Prior Publication Data

US 2024/0095633 A1    Mar. 21, 2024

Related U.S. Application Data

(63) Continuation of application No. PCT/CN2022/129419, filed on Nov. 3, 2022.

(30) Foreign Application Priority Data

Nov. 26, 2021  (CN) .......................... 202111424198.2

(51) Int. Cl.
    *G06Q 10/0633*  (2023.01)
(52) U.S. Cl.
    CPC ................ *G06Q 10/0633* (2013.01)
(58) Field of Classification Search
    CPC ......................................... G06Q 10/00–50/00
    USPC ................................. 705/7.11–7.42
    See application file for complete search history.

(56) References Cited

U.S. PATENT DOCUMENTS

| | | | | |
|---|---|---|---|---|
| 2006/0271927 A1* | 11/2006 | Morales | ................. | G06Q 10/06 717/171 |
| 2009/0076877 A1* | 3/2009 | Yano | .................... | G06Q 10/00 705/7.27 |
| 2009/0171708 A1* | 7/2009 | Bobak | .................. | G06Q 10/06 705/348 |
| 2010/0010953 A1* | 1/2010 | Meliksetian | ......... | G06Q 10/06 718/100 |
| 2011/0307360 A1 | 12/2011 | Duparc et al. | | |
| 2013/0054299 A1* | 2/2013 | Deshpande | ........... | G06Q 10/06 705/7.26 |

(Continued)

FOREIGN PATENT DOCUMENTS

| | | |
|---|---|---|
| CN | 101329624 A | 12/2008 |
| CN | 109447406 A | 3/2019 |

(Continued)

OTHER PUBLICATIONS

International Search Report issued Jan. 17, 2023 in PCT Appl. No. PCT/CN2022/129419, English translation (5 pages).

(Continued)

*Primary Examiner* — Alan S Miller (57) ABSTRACT

A method includes acquiring a to-be-used execution project flow, where the to-be-used execution project flow includes multiple to-be-used flow nodes; in response to detecting that an operation on at least one to-be-used flow node is a preset operation, updating the to-be-used execution project flow; and in response to detecting that a target control is triggered, using the updated to-be-used execution project flow as a target execution project flow.

15 Claims, 4 Drawing Sheets

---

Determine a to-be-used execution project flow from multiple to-be-selected execution project flows according to a preset configuration field — S210

When it is detected that an operation on at least one to-be-used flow node is a preset operation, update the to-be-used execution project flow — S220

When it is detected that a target control is triggered, use the updated to-be-used execution project flow as a target execution project flow — S230

(56) References Cited

U.S. PATENT DOCUMENTS

| | | | | |
|---|---|---|---|---|
| 2014/0052488 | A1* | 2/2014 | Minder | G06Q 10/06 |
| | | | | 705/7.15 |
| 2016/0155249 | A1* | 6/2016 | Moore | G06F 8/34 |
| | | | | 715/227 |
| 2018/0321830 | A1* | 11/2018 | Calhoun | G06F 8/38 |
| 2020/0145424 | A1* | 5/2020 | Chen | G06Q 10/063114 |
| 2020/0210479 | A1 | 7/2020 | Bequet et al. | |
| 2020/0334276 | A1* | 10/2020 | Conway | G16B 50/00 |
| 2021/0241191 | A1* | 8/2021 | Oara | G06F 8/34 |

FOREIGN PATENT DOCUMENTS

| | | | | |
|---|---|---|---|---|
| CN | 110070334 | A | 7/2019 | |
| CN | 110472925 | A | 11/2019 | |
| CN | 11178017 | * | 12/2019 | G06F 40/166 |
| CN | 111178017 | A | 5/2020 | |
| CN | 111598428 | A | 8/2020 | |
| CN | 111798161 | A | 10/2020 | |
| CN | 111813391 | A | 10/2020 | |

OTHER PUBLICATIONS

Notice of Rejection issued Nov. 10, 2023 in CN Appl. No. 202111424198.2, English translation (8 pages).
First Office Action issued Apr. 24, 2023 in CN Appl. No. 202111424198. 2, English translation (8 pages).
Second Office Action issued Jul. 14, 2023 in CN Appl. No. 202111424198.2, English translation (8 pages).

* cited by examiner

Add a visible condition

| Roles and modules ⌄ | Include ⌄ | Data development ⌄ |

⊕ Add a condition

Clear all conditions

Cancel    Confirm

METHOD FOR DETERMINING A PROJECT FLOW, ELECTRONIC DEVICE, AND STORAGE MEDIUM

CROSS-REFERENCE TO RELATED APPLICATION(S)

This is a continuation of International Patent Application NO. PCT/CN2022/129419, filed Nov. 3, 2022, which claims priority to Chinese Patent Application No. 202111424198.2 filed with the China National Intellectual Property Administration (CNIPA) on Nov. 26, 2021, the disclosures of which are incorporated herein by reference in its entirety.

TECHNICAL FIELD

Embodiments of the present disclosure relate to the field of computer technology, for example, a method and apparatus for determining a project flow, an electronic device, and a storage medium.

BACKGROUND

When an enterprise develops products or conducts business according to the market and a user's requirements, based on the work content, a corresponding project is first established, and the specific flow in the project is sorted out and planned to advance the work of multiple stages after the project is started.

However, an actual project is usually complex. A digitized project flow obtained by a conventional method may not match the actual project. It is also difficult for related users to personalize the project flow. As a result, the existing project flow does not have reusability and cannot satisfy the management demands of the actual project.

SUMMARY

Embodiments of the present disclosure provide a method and apparatus for determining a project flow, an electronic device, and a storage medium to personalize the project flow, thereby improving the matching degree between a final determined project flow and an actual project.

In a first aspect, an embodiment of the present disclosure provides a method for determining a project flow. The method includes the following.

A to-be-used execution project flow is acquired. The to-be-used execution project flow includes multiple to-be-used flow nodes.

In response to detecting that an operation on at least one to-be-used flow node is a preset operation, the to-be-used execution project flow is updated.

In response to detecting that a target control is triggered, the updated to-be-used execution project flow is used as a target execution project flow.

In a second aspect, an embodiment of the present disclosure provides an apparatus for determining a project flow. The apparatus includes a to-be-used execution project flow acquisition module, a to-be-used execution project flow updating module, and a target execution project flow determination module.

The to-be-used execution project flow acquisition module is configured to acquire a to-be-used execution project flow. The to-be-used execution project flow includes multiple to-be-used flow nodes.

The to-be-used execution project flow updating module is configured to, in response to detecting that an operation on at least one to-be-used flow node is a preset operation, update the to-be-used execution project flow.

The target execution project flow determination module is configured to, in response to detecting that a target control is triggered, use the updated to-be-used execution project flow as a target execution project flow.

In a third aspect, an embodiment of the present disclosure provides an electronic device. The electronic device includes one or more processors and a storage apparatus configured to store one or more programs.

When executed by the one or more processors, the one or more programs cause the one or more processors to perform the method for determining a project flow according to any one of the embodiments of the present disclosure.

In a fourth aspect, an embodiment of the present disclosure provides a storage medium including computer-executable instructions that, when executed by a computer processor, cause the computer processor to perform the method for determining a project flow according to any one of the embodiments of the present disclosure.

BRIEF DESCRIPTION OF DRAWINGS

Throughout the drawings, same or similar reference numerals in the drawings denote same or similar elements. It is to be understood that the drawings are illustrative and that originals and elements are not necessarily drawn to scale.

DETAILED DESCRIPTION

It is to be understood that the various steps recited in method embodiments of the present disclosure may be performed in a different order, and/or in parallel. Additionally, the method embodiments may include an additional step and/or omit the execution of a step shown. The scope of the present disclosure is not limited in this respect.

The term "comprise" and variations thereof are intended to be inclusive, that is, "including, but not limited to". The term "based on" is "at least partially based on". The term "an embodiment" refers to "at least one embodiment". The term "another embodiment" refers to "at least one another embodiment". The term "some embodiments" refers to "at least some embodiments". Related definitions of other terms are given in the description hereinafter.

It is to be noted that references to "first", "second" and the like in the present disclosure are merely intended to distinguish one from another apparatus, module, or unit and are not intended to limit the order or interrelationship of the functions performed by the apparatus, module, or unit.

It is to be noted that "one" and "a plurality" mentioned in the present disclosure are illustrative and not limiting, and that those skilled in the art should understand that "one" and "a plurality" should be understood as "one or more" unless clearly expressed in the context.

Figure 1:
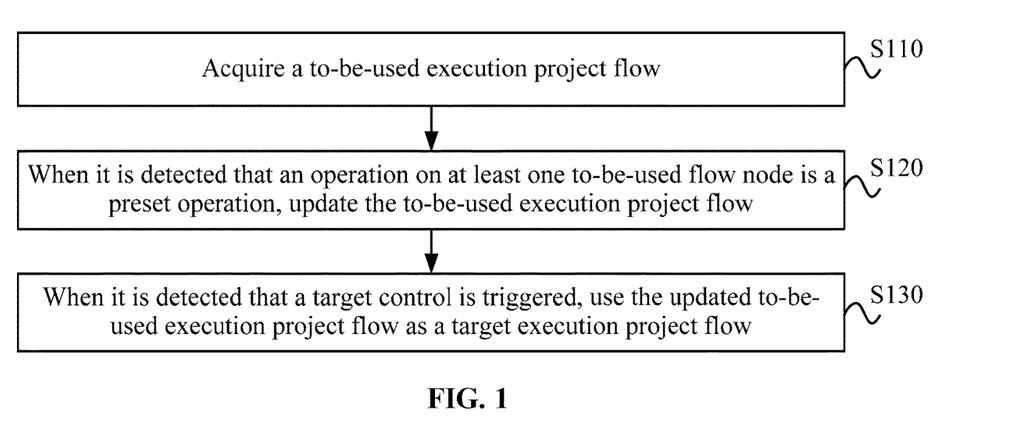
FIG. 1 is a flowchart of a method for determining a project flow according to an embodiment of the present disclosure.

FIG. 1 is a flowchart of a method for determining a project flow according to an embodiment of the present disclosure. This embodiment may be implemented in the case where a project flow in the related art is processed to obtain a project flow matching an actual project. This method may be executed by an apparatus for determining a project flow. The apparatus may be implemented in the form of software and/or hardware. The hardware may be an electronic device, such as a mobile terminal, a personal computer (PC) terminal, or a server.

Before the technical schemes are introduced, an application scenario may be illustrated first. The technical schemes may be applied to any scenario where a project flow having a high matching degree is determined for an actual project based on the project flow in the related art. For example, an enterprise creates a project according to the market and a user's requirements and wishes to quickly build a project flow having a high matching degree for the project based on the project flow in the related art. At this time, an execution project flow in the related art may be acquired based on the technical schemes, and the project flow in the related art may be updated based on a preset operation, so that a target execution project flow having a high matching degree with the actual project may be obtained.

As shown in FIG. 1, the method in this embodiment includes the following.

In S110, a to-be-used execution project flow is acquired.

For a project established by an enterprise for a product or business, the relevant staff need to establish a corresponding project process for the actual work content of the project to control multiple links of the project after the project is conducted. For example, the enterprise may formulate a corresponding project process for an Internet product. The process includes multiple stages such as project start, development and testing, and launching. There is work content associated with each stage.

On this basis, in this embodiment, an execution project flow is a digitized carrier of a project process and may at least reflect multiple work stages in the project process and the correlation between the multiple work stages. The execution project flow may be stored and displayed in the form of a document, a flowchart, or other forms. The relevant personnel of the project may monitor and manage the whole project and the work of multiple stages according to the execution project flow corresponding to the project.

In an actual application, there may be several methods for generating a project flow. For example, after a project leader determines a target project, an execution project flow in the form of text may be edited manually according to experience. The project flow is named and stored. Alternatively, a project flow is generated in a platform or system according to the flow management requirements of an actual project. For example, the relevant staff may divide the overall project scheme into multiple stages according to a certain division rule by using the platform or system for generating the project flow, thereby generating a project flow in the form of a flowchart. For example, the generated project flow may be stored in particular storage space so that the project flow is invoked when the project flow is displayed on a page.

In this embodiment, the execution project flow that is generated and stored is the to-be-used execution project flow. It is to be understood that there may be one or more to-be-used execution project flows. A to-be-used execution project flow may at least correspond to a certain type of project. For example, a to-be-used execution project flow having identifier A stored in a repository may correspond to a development project of a big data related product.

For example, the to-be-used execution project flow also includes multiple to-be-used flow nodes. It is to be understood by those skilled in the art that each of the multiple stages of an actual project may be associated with a particular executor and the theme corresponding to the execution content of each stage. In the to-be-used execution project flow, carriers of the related information of the preceding multiple stages are to-be-used flow nodes. In each to-be-used execution project flow, there may be multiple flow nodes. The number of flow nodes is determined by the actual work content of the project and the project management requirements. A flow node may correspond to either a certain stage in the project or a certain step in a single stage of the project. For example, the flow nodes of a target to-be-configured project include an initiating review node, an evaluation node, a requirement analysis node, a development node, a test node, and a publishing node. The initiating review node, the evaluation node, and the requirement analysis node correspond to the start stage of the project. The development node and the test node correspond to the development and test stage of the project. The publishing node corresponds to the launching stage of the project.

In this embodiment, when multiple execution project flows are stored in a repository, the to-be-used execution project flow may be acquired by multiple methods. For example, all project flows may be displayed on a particular page of a platform or system. One or more of the project flows may be manually selected by a user and used as to-be-used execution project flows. Alternatively, in response to a project flow acquisition instruction initiated by the user, tag information carried by the instruction may be extracted by parsing the instruction. In this manner, the project flow associated with the tag is selected among multiple execution project flows based on the tag information, used as the to-be-used execution project flow, and provided to the user. It is to be understood by those skilled in the art that the method for acquiring the to-be-used execution project flow may be selected according to the actual situation. This is not limited in the embodiments of the present disclosure. It is to be noted that the to-be-used execution project flow is acquired, that is, multiple to-be-used flow nodes included in the project flow are acquired, and it is to be understood that a project flowchart corresponding to a project is determined.

In S120, when it is detected that an operation on at least one to-be-used flow node is a preset operation, the to-be-used execution project flow is updated.

In this embodiment, after the to-be-used execution project flow is acquired, it is also possible to detect the operation on the project flow. Further, when the preset operation on the at least one to-be-used flow node is detected, the to-be-used project flow is updated.

For example, after a to-be-used execution project flow is loaded in a platform or system for determining a project flow, the user may operate multiple to-be-used flow nodes by clicking and dragging. In this case, an instruction set reflecting multiple operations for a flow node is pre-stored in the platform or system, such as a click operation instruction and a drag instruction for a flow node. It is to be understood that the operation corresponding to the preceding instructions is the preset operation. In this case, for a to-be-used flow node, different operation instructions correspond to different processing methods, thereby triggering different effects. For example, when the user clicks a flow node and enters text information on a configuration page related to the flow node, the name of the node may be modified. When the user double-clicks a flow node, the node may be deleted, which indicates that the current project does not need to perform the work corresponding to the flow node. When the user drags a flow node, the execution order of the multiple stages of the project may be changed. It is to be noted that in an actual application, the preset operation and its operation instructions may be set according to the requirements of the platform or the system for determining a project flow. This is not limited in the embodiments of the present disclosure.

For example, after the preset operation is detected, and the corresponding to-be-used flow node is processed according to the operation, the to-be-used execution project flow is updated. It is to be understood that a new project flow is determined on the basis of the original project flow, and the updated project flow matches the actual project more closely. For example, when the platform or system for determining a project flow shows the user a to-be-used execution project flow on a page, the project flow includes an initiating review node, an evaluation node, a requirement analysis node, a development node, a test node, and a publishing node. For the project that needs to be implemented at this time, requirement analysis is not required. At this time, a project leader may delete the to-be-used flow node by double-clicking the requirement analysis node.

The preset operation on the to-be-used flow node is detected. In this manner, not only is the flow node modified, but also operations other than the preset operation are prevented from destroying the execution project flow in the related art.

In S130, when it is detected that a target control is triggered, the updated to-be-used execution project flow is used as a target execution project flow.

In this embodiment, after the to-be-used flow node is processed based on the detected preset operation, a new project flow obtained on the basis of the original to-be-used execution project flow is the target execution project flow. It is to be understood that the target execution project flow matches the actual project more closely. In the preceding example, after the project leader deletes the requirement analysis node from the to-be-used execution project flow in the platform or system, the obtained new execution project flow including only an initiating review node, an evaluation node, a development node, a test node, and a publishing node is the target execution project flow corresponding to the actual project.

In this embodiment, the operation of determining the target execution project flow may be triggered by the target control. For example, in the platform or system for determining a project flow, the target control may be a visual control specifically developed for determining the target execution project flow. For example, a control for "determining a project flow" is developed. A click operation on the control is detected, so that the updated execution project flow is used as the target execution project flow.

In an actual application, the target control, as the encapsulation of data and methods, may also have attributes and methods. For example, multiple node editing controls associated with nodes may be used as target controls. It is to be understood that the node editing control is a control that detects and responds to the preset operation on the node. After the user confirms the operation contents in the control, for the platform or system, the determination operation of the target execution project flow may be triggered.

It is to be noted that in this embodiment, after the target execution project flow is determined based on the to-be-used execution project flow, a newly generated project flow may also be used as a template and stored in the storage space of the platform or system. At the same time, a tag that represents a project type is marked for the template. On this basis, when subsequent other projects of the same type or a similar type need to determine a project flow, the target execution project flow associated with the tag may be used as a to-be-used execution project flow and used directly by other project leaders. Alternatively, a personalized customization operation in the preceding schemes of this embodiment may be performed on the project flow.

In the technical schemes of this embodiment, first, the to-be-used execution project flow is acquired, that is, a project operation program template in the related art is obtained. When it is detected that the operation on at least one to-be-used flow node is the preset operation, the to-be-used execution project flow is updated. When it is detected that the target control is triggered, the updated to-be-used execution project flow is used as the target execution project flow. In this manner, the project flow in the related art has reusability, and a method for updating the project flow in the related art according to an actual project management demand is provided for the user. Thus, the project flow is personalized, and the matching degree between a final determined project flow and an actual project is improved.

Figure 2:
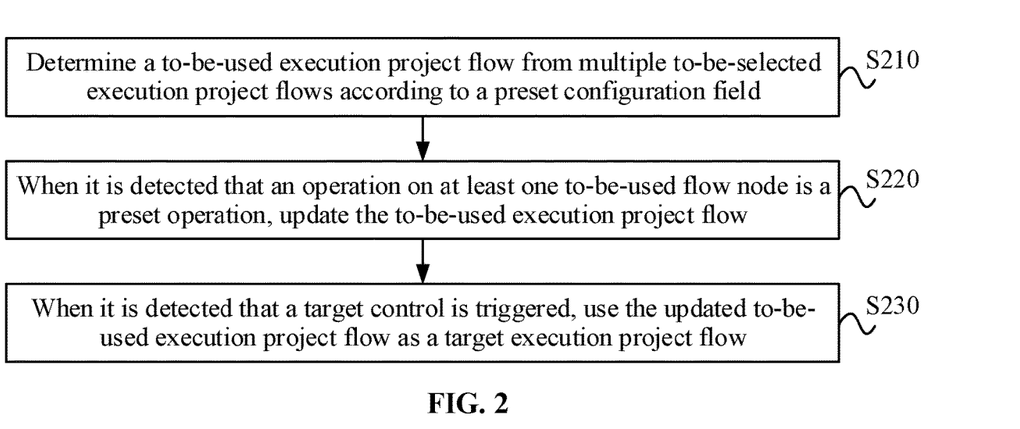
FIG. 2 is a flowchart of a method for determining a project flow according to another embodiment of the present disclosure.

FIG. 2 is a flowchart of a method for determining a project flow according to another embodiment of the present disclosure. On the basis of the preceding embodiment, the to-be-used execution project flow is determined according to a configuration field, that is, a project operation program template closest to an actual project is determined. For example, based on a trigger operation on the to-be-used flow node, the flow node and nodes associated with the node are deleted, so that the clipping of the to-be-used execution project flow is implemented, and the user's demand for personalized customization of the project flow is satisfied. For example embodiments thereof, reference may be made to the technical schemes of this embodiment. Technical terms identical to or corresponding to the preceding embodiment are not repeated here.

As shown in FIG. 2, the method includes the following.

In S210, a to-be-used execution project flow is determined from multiple to-be-selected execution project flows according to a preset configuration field.

In this embodiment, multiple execution project flows may be stored in the storage space of a platform or system for determining a project flow. It is to be understood that these project flows, as project operation program templates corresponding to multiple types of projects, may at least reflect project processes of the multiple projects. For a project leader, to satisfy the actual project management requirements, only one project flow needs to be updated to obtain the final target execution project flow. Thus, multiple project flows pre-stored in the platform or system may be used as to-be-selected execution project flows.

In this embodiment, the to-be-used execution project flow is selected from multiple to-be-selected execution project flows according to the preset configuration field. The configuration field may be a preset project type or an important field. For example, tag information carried in the to-be-selected execution project flow may represent a project type, such as a "mobile terminal product development project flow" and a "big data product development project flow". Important fields may be fields consistent with the keywords in names of multiple to-be-selected execution project flows, such as iOS and Data. It is to be understood that a project type or important field that may be used as a configuration field may be a summary and reflection of the substantive work content of the project.

In an actual application, the configuration field may be carried in an instruction for determining the target execution project flow sent to the platform or the system. It is to be understood that the platform or system parses and extracts instructions, so that the platform or the system may determine the configuration field carried in the instructions.

For example, the to-be-used execution project flow may be selected from multiple to-be-selected execution project flows by field matching based on the determined configuration field. For example, when the project type is determined to be the "mobile terminal product development project flow" in the preceding example, this field is matched with names of multiple project flows to determine the to-be-used execution project flow. It is also possible to traverse and match multiple to-be-used flow nodes in each to-be-selected execution project flow by field matching, and based on the matching result, the project flow corresponding to the flow node in the result is used as the target execution project flow. For example, when it is determined that the important field is Data, it is also possible to traverse multiple flow nodes in each to-be-selected execution project flow to determine three to-be-used flow nodes "Data estimation scheduling", "Data development", and "Data test". For example, the project flow including the preceding three to-be-used flow nodes is used as the to-be-used execution project flow.

In S220, when it is detected that an operation on at least one to-be-used flow node is a preset operation, the to-be-used execution project flow is updated.

In an actual application, there are multiple cases where the to-be-used execution project flow is updated according to the detected preset operation, and multiple cases are described in detail below.

For example, when it is detected that a trigger operation on the current to-be-used flow node is a delete operation, the current to-be-used flow node is deleted, and the to-be-used execution project flow is updated. The process is described in detail below with reference to FIG. 3.

Figure 3:
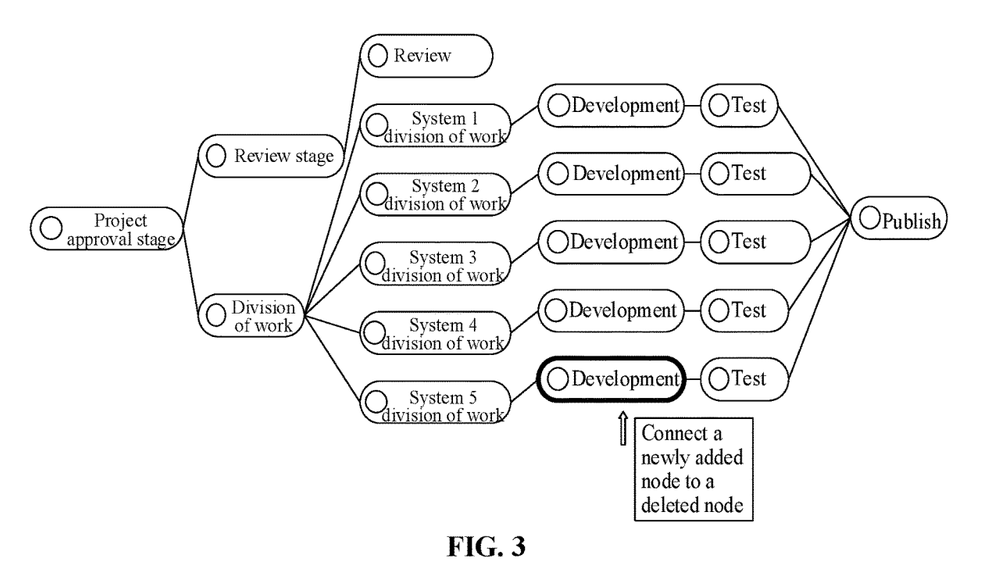
FIG. 3 is a to-be-used execution project flow according to an embodiment of the present disclosure.

Referring to FIG. 3, when the platform or system for determining a project flow shows the to-be-used execution project flow shown in FIG. 3 on a page, the user may perform a trigger operation such as clicking and dragging on a to-be-used flow node therein. When the "Data development" node is clicked, the platform or system may display a menu corresponding to the to-be-used flow node. The menu includes multiple options such as "add a node", "connect to", and "delete a node". It is to be understood that multiple options are associated with actual operation instructions. For example, when the user clicks the "delete a node" option, the deletion operation on the to-be-used flow node may be triggered. At this time, the platform or the system may delete the "Data development" node from the to-be-used execution project flow, and the to-be-used execution project flow is updated.

It is to be noted that in an actual application, in the to-be-used execution project flow, some to-be-used flow nodes may be associated with multiple other flow nodes. In this case, when a task of a certain stage does not need to be executed according to the requirement of an actual project, multiple tasks that are dependent on the task of the stage also do not need to be executed. When these flow nodes are deleted, the system also adaptively deletes other flow nodes that are dependent on the deleted nodes, such as the "Data estimation scheduling" node and the "Data test" node shown in FIG. 3.

For example, when it is detected that the current to-be-used flow node is triggered, preset node attribute information corresponding to the current to-be-used flow node is displayed. When it is detected that association role information or visual node information in the node attribute information is modified, a to-be-deleted flow node associated with the current to-be-used flow node is determined. The to-be-used execution project flow is updated based on the to-be-deleted flow node. The process is described in detail below with reference to FIGS. 4 and 5.

Figure 4:
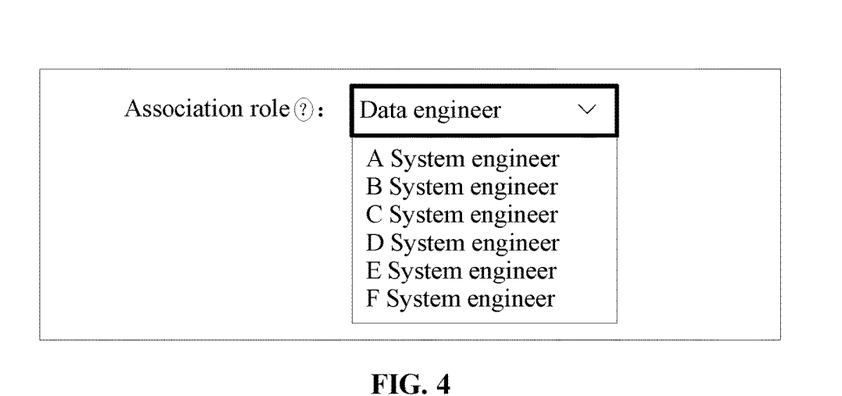
FIG. 4 is a node association role editing page according to an embodiment of the present disclosure.

Referring to FIG. 4, in the platform or system for determining a project flow, a node information editing page may be pre-deployed. For example, after the to-be-used execution project flow is displayed on a page, when it is detected that the user selects a to-be-used flow node in the project flow, the corresponding node information editing page may be triggered to display. It is to be understood that the node attribute information of the to-be-used node is displayed on the node information editing page, and an editing function for the node attribute information is provided.

In this embodiment, the node attribute information may be information reflecting the staff and work contents in multiple stages of the project and may include at least one of a node identifier, a node name, a node collaboration user, node authorization information, node execution duration, a node operation type, a node transfer type, a node restriction type, a previous node identifier, or a node event. The information that can affect the deletion of the flow node is the association role information and the visual node information.

Referring to FIG. 4, on the node information editing page, when the to-be-used flow node selected by the user has the attribute of "deletable", the "association role" information of this node may be modified. In this embodiment, the "association role" may at least determine the delete operation on the related node. It may be understood as the leader or executor of the project task corresponding to this node. It is to be understood that when the association role of a to-be-used flow node is modified, it may be determined that multiple flow nodes corresponding to the modified role need to be deleted. The nodes that need to be deleted are to-be-deleted nodes. In the actual project, it is to be understood that tasks/events related to the modified leader or executor do not need to be executed.

Figure 5:
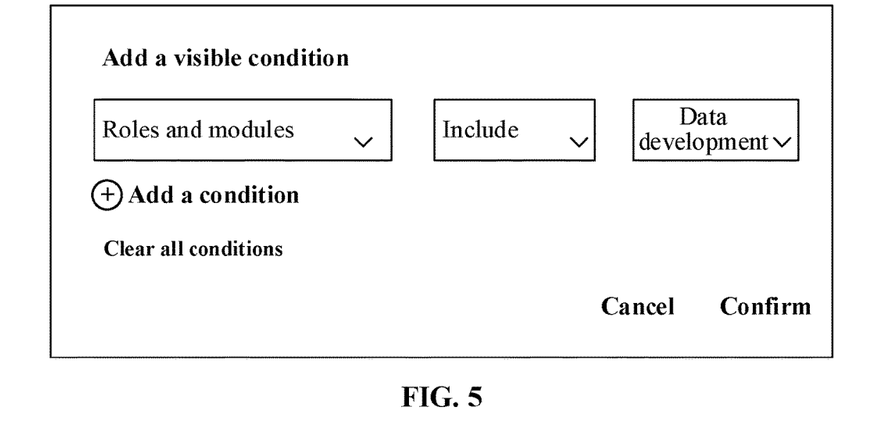
FIG. 5 is a visual node information editing page according to an embodiment of the present disclosure.

Referring to FIG. 5, on the node information editing page, the visible condition of a node may also be set directly. It is to be understood that this type of attribute information may also determine whether a flow node needs to be deleted in the current project flow. For example, when the user adds the "Data development" field in the "add a visible condition", uses the "Data development" field as the condition for whether to delete the flow node, and confirms it, all nodes related to the Data development in the current to-be-used execution project flow are to-be-deleted flow nodes.

In this embodiment, through the preceding two methods, the to-be-deleted flow node may be determined from the to-be-used flow node, and then the to-be-used execution project flow is updated.

For example, when it is detected that the association role information in the node attribute information is deleted, the to-be-deleted flow node associated with the current to-beused flow node is determined. Alternatively, when it is detected that the content corresponding to the visual node information in the node attribute information is deleted, the to-be-deleted flow node associated with the current to-be-used flow node is determined.

Further referring to FIG. 4, on the node information editing page, the project leader may select "Data engineer" from various types of roles provided by a preset set of association roles and use the "Data engineer" as the association role of the "Data development" node. For example, when the platform or system deletes the role, the "Data development" node corresponding to the role (and subsequent multiple nodes involving big data tasks) may be determined to be the to-be-deleted flow node. It is to be understood by those skilled in the art that the platform or system may also provide a recovery function for an association role and its associated nodes, that is, after the "Data engineer" in the preceding example is recovered, the nodes associated with the role may also be removed from the set of to-be-deleted flow nodes.

Further referring to FIG. 5, on the node information editing page, it may be determined that the visible node information may include "Data development". For this reason, when it is detected that the content related to big data development in the project is deleted, it may be determined that the node related to "Data development" is the to-be-deleted flow node.

For example, the current to-be-used flow node is used as a master node. A to-be-used flow node dependent on the master node is searched downward, and the to-be-used flow node is used as the to-be-deleted flow node.

To-be-used flow nodes may be divided into a master node and a slave node. For multiple flow nodes corresponding to an execution flow, a master flow node and a slave flow node are a relative concept. A master/slave concept is set for a flow node, so that at least the execution sequence of multiple nodes and the correlation between the nodes may be reflected.

In this embodiment, after the user determines the to-be-deleted flow nodes in the to-be-used execution project flow, the nodes may be used as master nodes, indicating that the actual project tasks/events corresponding to the nodes do not need to be executed. At the same time, other tasks/events associated with the project tasks/events also do not need to be executed. On this basis, the platform or system for determining a project flow may automatically search downward for the to-be-used flow node that is dependent on the master node. It is to be understood that one or more nodes that are dependent on the node are automatically determined. For example, the node determined by the platform or the system is also determined to be a to-be-deleted node.

For example, in FIG. 3, when it is determined that the "Data estimation scheduling" node is used as the to-be-deleted flow node, it indicates that the project leader deletes the association role information of the node or deletes the content corresponding to the visual node information of the node, that is, the actual project does not need to execute the task/event related to the big data. At this time, the platform or the system for determining a project flow may use the "Data estimation scheduling" as a master node, performs a downward search operation based on the node, determine the "Data development" node and the "Data test" node that are dependent on the node, and further use the two determined nodes as the to-be-deleted flow nodes.

Figure 6:
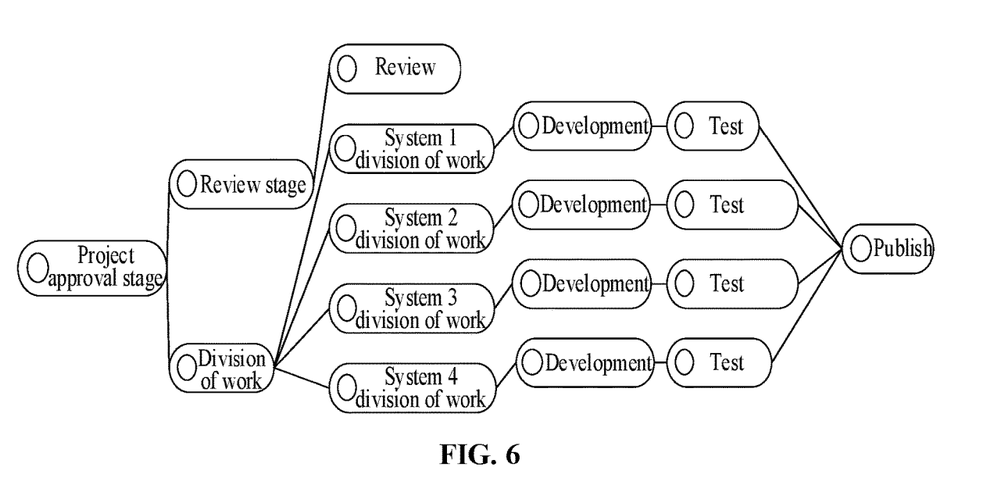
FIG. 6 is an updated to-be-used execution project flow according to an embodiment of the present disclosure.

For example, when it is determined that the "Data estimation scheduling" node, the "Data development" node, and the "Data test" node in FIG. 3 are the to-be-deleted flow nodes, the platform or the system may delete these nodes, update the to-be-used execution project flow, and obtain the updated to-be-used execution project flow as shown in FIG. 6.

In S230, when it is detected that a target control is triggered, the updated to-be-used execution project flow is used as a target execution project flow.

In the technical schemes of this embodiment, the to-be-used execution project flow is determined according to the configuration field, that is, the project operation program template closest to an actual project is determined. For example, based on the trigger operation on the to-be-used flow node, the flow node and nodes associated with the node are deleted, so that the clipping of the to-be-used execution project flow is implemented, and the user's demand for personalized customization of the project flow is satisfied.

Figure 7:
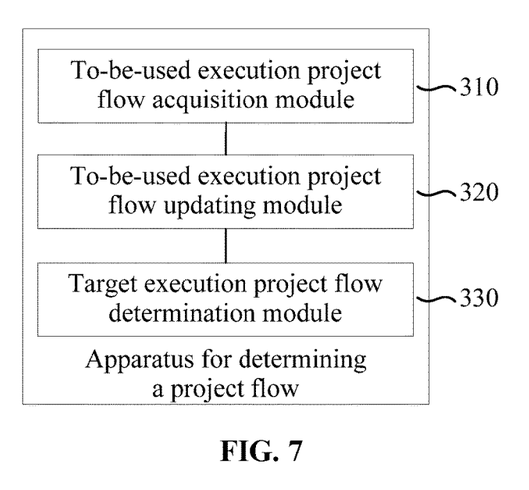
FIG. 7 is a block diagram illustrating the structure of an apparatus for determining a project flow according to an embodiment of the present disclosure.

FIG. 7 is a block diagram illustrating the structure of an apparatus for determining a project flow according to an embodiment of the present disclosure. The apparatus may execute the method for determining a project flow according to any embodiment of the present disclosure and has functional modules and beneficial effects corresponding to the method executed. As shown in FIG. 7, the apparatus includes a to-be-used execution project flow acquisition module 310, a to-be-used execution project flow updating module 320, and a target execution project flow determination module 330.

The to-be-used execution project flow acquisition module 310 is configured to acquire a to-be-used execution project flow. The to-be-used execution project flow includes multiple to-be-used flow nodes.

The to-be-used execution project flow updating module 320 is configured to, when it is detected that an operation on at least one to-be-used flow node is a preset operation, update the to-be-used execution project flow.

The target execution project flow determination module 330 is configured to, when it is detected that a target control is triggered, use the updated to-be-used execution project flow as a target execution project flow.

For example, the to-be-used execution project flow acquisition module 310 is configured to determine the to-be-used execution project flow from multiple to-be-selected execution project flows according to a preset configuration field.

For example, the to-be-used execution project flow updating module 320 is configured to, when it is detected that the trigger operation on the current to-be-used flow node is the delete operation, delete the current to-be-used flow node and update the to-be-used execution project flow.

On the basis of the preceding multiple technical schemes, the to-be-used execution project flow updating module 320 includes a node attribute information display unit, a to-be-deleted flow node determination unit, and a to-be-used execution project flow updating unit.

The node attribute information display unit is configured to, when it is detected that the current to-be-used flow node is triggered, display the preset node attribute information corresponding to the current to-be-used flow node.

The to-be-deleted flow node determination unit is configured to, when it is detected that the association role information or visual node information in the node attribute information is modified, determine the to-be-deleted flow node associated with the current to-be-used flow node.

The to-be-used execution project flow updating unit is configured to update the to-be-used execution project flow based on the to-be-deleted flow node.

For example, the to-be-deleted flow node determination unit is configured to, when it is detected that the association role information in the node attribute information is deleted, determine the to-be-deleted flow node associated with the current to-be-used flow node; or when it is detected that the content corresponding to the visual node information in the node attribute information is deleted, determine the to-be-deleted flow node associated with the current to-be-used flow node.

For example, the to-be-deleted flow node determination unit is configured to use the current to-be-used flow node as the master node, search downward for the to-be-used flow node dependent on the master node, and use the to-be-used flow node as the to-be-deleted flow node.

In the technical schemes of this embodiment, first, the to-be-used execution project flow is acquired, that is, the project operation program template in the related art is obtained. When it is detected that the operation on at least one to-be-used flow node is the preset operation, the to-be-used execution project flow is updated. When it is detected that the target control is triggered, the updated to-be-used execution project flow is used as the target execution project flow. In this manner, the project flow in the related art has reusability, and the method for updating the project flow in the related art according to an actual project management demand is provided for the user. Thus, the project flow is personalized, and the matching degree between the final determined project flow and the actual project is improved.

The apparatus for determining a project flow provided by this embodiment of the present disclosure may execute the method for determining a project flow provided by any embodiment of the present disclosure and has functional modules and beneficial effects corresponding to the method executed.

It is to be noted that multiple units and modules included in the preceding apparatus are just divided according to functional logic, but are not limited to the division, as long as the corresponding functions can be implemented. Additionally, the names of multiple functional units are just intended for distinguishing, and are not to limit the protection scope of embodiments of the present disclosure.

Figure 8:
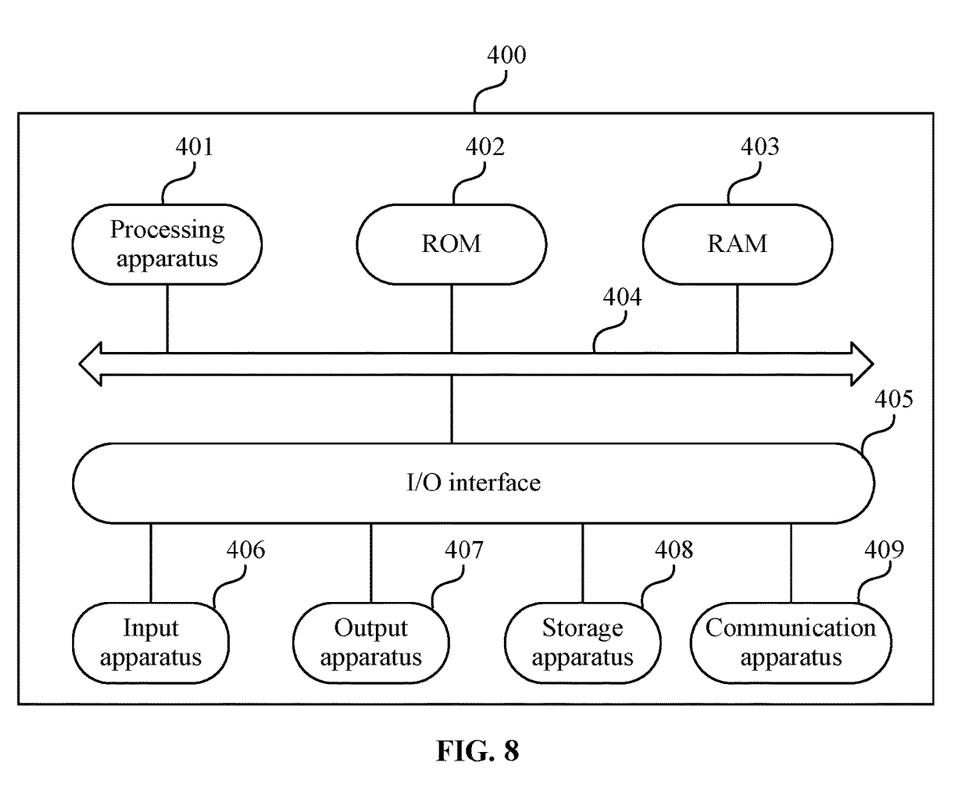
FIG. 8 is a diagram illustrating the structure of an electronic device according to an embodiment of the present disclosure.

FIG. 8 is a diagram illustrating the structure of an electronic device according to an embodiment of the present disclosure. Referring to FIG. 8, FIG. 8 shows a diagram illustrating the structure of an electronic device 400 (such as a terminal device or server in FIG. 8) applicable to implementing an embodiment of the present disclosure. A terminal device in the embodiments of the present disclosure may include, but is not limited to, mobile terminals such as a mobile phone, a laptop, a digital broadcast receiver, a personal digital assistant (PDA), a PAD, a portable media player (PMP), and an in-vehicle terminal (such as an in-vehicle navigation terminal) and stationary terminals such as a digital television (TV) and a desktop computer. The electronic device shown in FIG. 8 is merely an example and is not intended to limit the function and usage scope of the embodiments of the present disclosure.

As shown in FIG. 8, the electronic device 400 may include a processing apparatus 401 (such as a central processing unit and a graphics processing unit). The processing apparatus 401 may perform various types of appropriate operations and processing according to a program stored in a read-only memory (ROM) 402 or a program loaded from a storage apparatus 408 to a random-access memory (RAM) 403. The RAM 403 also stores various programs and data required for the operation of the electronic device 400. The processing apparatus 401, the ROM 402, and the RAM 403 are connected to each other through a bus 404. An input/output (I/O) interface 405 is also connected to the bus 404.

Generally, the following apparatuses may be connected to the I/O interface 405: an input apparatus 406 such as a touch screen, a touch pad, a keyboard, a mouse, a camera, a microphone, an accelerometer, and a gyroscope; an output apparatus 407 such as a liquid crystal display (LCD), a speaker, and a vibrator; the storage apparatus 408 such as a magnetic tape and a hard disk; and a communication apparatus 409. The communication apparatus 409 may allow the electronic device 400 to perform wireless or wired communication with other devices to exchange data. Although FIG. 8 shows the electronic device 400 having various apparatuses, it is to be understood that not all the apparatuses shown herein need to be implemented or present. Alternatively, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried in a non-transitory computer-readable medium. The computer program includes program codes for executing the method shown in the flowchart. In such an embodiment, the computer program may be downloaded from a network and installed through the communication apparatus 409, or may be installed from the storage apparatus 408, or may be installed from the ROM 402. When the computer program is executed by the processing apparatus 401, the preceding functions defined in the methods of the embodiments of the present disclosure are performed.

The names of messages or information exchanged between multiple apparatuses in the embodiments of the present disclosure are only for illustrative purposes and are not intended to limit the scope of such messages or information.

The electronic device provided in this embodiment of the present disclosure belongs to the same concept as the method for determining a project flow provided in the preceding embodiments, and for the technical details not described in detail in this embodiment, reference can be made to the preceding embodiments, and this embodiment has the same beneficial effects as the preceding embodiments.

An embodiment of the present disclosure provides a computer-readable storage medium. The storage medium stores a computer program. The computer program, when executed by a computer processor, causes the computer processor to perform the method for determining a project flow according to the preceding embodiments.

It is to be noted that the preceding computer-readable medium in the present disclosure may be a computer-readable signal medium, or a computer-readable storage medium, or any combination thereof. The computer-readable storage medium may be, but is not limited to, an electrical, magnetic, optical, electromagnetic, infrared or semiconductor system, apparatus or device, or any combination thereof. More examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium other than the computer-readable storage medium. The computer-readable signal medium may send, propagate, or transmit a program used by or in conjunction with an instruction execution system, apparatus, or device. The program codes included on the computer-readable medium may be transmitted via any appropriate medium which includes, but is not limited to, a wire, an optical cable, radio frequency (RF), or any appropriate combination thereof.

In some embodiments, clients and servers may communicate using any currently known or future-developed network protocol, such as the Hypertext Transfer Protocol (HTTP), and may be interconnected with any form or medium of digital data communication (such as a communication network). Examples of the communication network include a local area network (LAN), a wide area network (WAN), an inter-network (such as the Internet) and a peer-to-peer network (such as an ad hoc network), as well as any currently known or future-developed network.

The preceding computer-readable medium may be included in the preceding electronic device or may exist alone without being assembled into the electronic device.

The preceding computer-readable medium carries one or more programs. When the one or more programs are executed by the electronic device, the electronic device is configured to acquire the to-be-used execution project flow, where the to-be-used execution project flow includes multiple to-be-used flow nodes; when it is detected that the operation on at least one to-be-used flow node is the preset operation, update the to-be-used execution project flow; and when it is detected that the target control is triggered, use the updated to-be-used execution project flow as the target execution project flow.

Computer program codes for performing the operations in the present disclosure may be written in one or more programming languages or combination thereof. The preceding one or more programming languages include, but are not limited to, object-oriented programming languages such as Java, Smalltalk, and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case relating to the remote computer, the remote computer may be connected to the user computer via any type of network including a local area network (LAN) or a wide area network (WAN), or may be connected to an external computer (for example, via the Internet through an Internet service provider).

The flowcharts and block diagrams in the drawings show possible architectures, functions, and operations of the system, method, and computer program product according to multiple embodiments of the present disclosure. In this regard, each block in the flowcharts or block diagrams may represent a module, a program segment, or portion of code that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, depending on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The names of the units in some cases do not constitute a limitation on the units themselves. For example, a first acquisition unit may also be described as "a unit for acquiring at least two Internet protocol addresses".

The functions described above herein may be executed, at least partially, by one or more hardware logic components. For example, and without limitations, example types of hardware logic components that may be used include: a field-programmable gate array (FPGA), an application-specific integrated circuit (ASIC), an application-specific standard product (ASSP), a system on a chip (SOC), and a complex programmable logic device (CPLD).

In the context of the present disclosure, a machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any appropriate combination thereof.

According to one or more embodiments of the present disclosure, [example one] provides a method for determining a project flow. The method includes the following.

The to-be-used execution project flow is acquired. The to-be-used execution project flow includes multiple to-be-used flow nodes.

When it is detected that the operation on at least one to-be-used flow node is the preset operation, the to-be-used execution project flow is updated.

When it is detected that the target control is triggered, the updated to-be-used execution project flow is used as the target execution project flow.

According to one or more embodiments of the present disclosure, [example two] provides a method for determining a project flow, and the method also includes the following.

For example, the to-be-used execution project flow is determined from multiple to-be-selected execution project flows according to the preset configuration field.

According to one or more embodiments of the present disclosure, [example three] provides a method for determining a project flow, and the method also includes the following.

For example, when it is detected that the trigger operation on the current to-be-used flow node is the delete operation, the current to-be-used flow node is deleted, and the to-be-used execution project flow is updated.

For multiple main flow nodes, when it is detected that the current main flow node is triggered, the slave flow node corresponding to the current main flow node is added. When it is detected that the slave flow node is triggered, the slave flow node is used as the current main flow node.

According to one or more embodiments of the present disclosure, [example four] provides a method for determining a project flow, and the method also includes the following.

For example, when it is detected that the current to-be-used flow node is triggered, the preset node attribute information corresponding to the current to-be-used flow node is displayed.

When it is detected that the association role information or visual node information in the node attribute information is modified, the to-be-deleted flow node associated with the current to-be-used flow node is determined.

The to-be-used execution project flow is updated based on the to-be-deleted flow node.

According to one or more embodiments of the present disclosure, [example five] provides a method for determining a project flow, and the method also includes the following.

For example, when it is detected that the association role information in the node attribute information is deleted, the to-be-deleted flow node associated with the current to-be-used flow node is determined.

Alternatively, when it is detected that the content corresponding to the visual node information in the node attribute information is deleted, the to-be-deleted flow node associated with the current to-be-used flow node is determined.

According to one or more embodiments of the present disclosure, [example six] provides a method for determining a project flow, and the method also includes the following.

For example, the current to-be-used flow node is used as the master node. The to-be-used flow node dependent on the master node is searched downward, and the to-be-used flow node is used as the to-be-deleted flow node.

According to one or more embodiments of the present disclosure, [example seven] provides an apparatus for determining a project flow, and the apparatus also includes the following.

The to-be-used execution project flow acquisition module is configured to acquire the to-be-used execution project flow. The to-be-used execution project flow includes multiple to-be-used flow nodes.

The to-be-used execution project flow updating module is configured to, when it is detected that the operation on the at least one to-be-used flow node is the preset operation, update the to-be-used execution project flow.

The target execution project flow determination module is configured to, when it is detected that the target control is triggered, use the updated to-be-used execution project flow as the target execution project flow.

In addition, although the operations are depicted in a particular order, this should not be construed as requiring that such operations should be performed in the particular order shown or in a sequential order. In certain circumstances, multitasking and parallel processing may be advantageous. Similarly, although implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually or in any suitable subcombination.

What is claimed is:

1. A computer-implemented method for determining a workflow for a product development process, comprising:
    acquiring a workflow for a product development process, wherein the workflow comprises a plurality of flow nodes;
    detecting whether an operation on at least one of the plurality of flow nodes is a preset operation, and updating the workflow when the operation is determined as the preset operation; and
    triggering a target control, using the updated workflow as a target workflow, and storing the target workflow as a template;
    wherein detecting whether the operation on the at least one of the plurality of flow nodes is the preset operation, and updating the workflow when the operation is determined as the preset operation comprises:
    detecting whether association role information or visual node information in node attribute information corresponding to a current flow node is modified, and determining a to-be-deleted flow node associated with the modified association role information or modified visual node information when the association role information or visual node information is determined to be modified; and
    deleting the to-be-deleted flow node of the workflow to update the workflow;
    wherein the visual node information is information about visible flow nodes.

2. The method according to claim 1, wherein acquiring the workflow comprises:
    determining the workflow from a plurality of to-be-selected workflows according to a preset configuration field.

3. The method according to claim 1, wherein detecting whether the operation on the at least one flow node is the preset operation, and updating the workflow when the operation is determined as the preset operation comprises:
    detecting whether a trigger operation on a current flow node of the plurality of flow nodes is a delete operation, and deleting the current flow node and updating the workflow when the trigger operation is determined as the delete operation.

4. The method according to claim 1, wherein detecting whether the association role information or the visual node information in the node attribute information corresponding to the current flow node is modified, and determining the to-be-deleted flow node associated with the modified association role information or modified visual node information when the association role information or visual node information is determined to be modified comprises:
    detecting whether the association role information in the node attribute information is deleted, and determining the to-be-deleted flow node associated with the deleted association role information when the association role information in the node attribute information is deleted; or detecting whether content corresponding to the visual node information in the node attribute information is deleted, and determining the to-be-deleted flow node associated with the deleted content when the content is deleted.

5. The method according to claim 1, wherein determining the to-be-deleted flow node associated with the modified association role information or modified visual node information when the association role information or visual node information is determined to be modified comprises:
using the current flow node as a master node, searching downward from the plurality of flow nodes for a flow node dependent on the master node, and using the flow node as the to-be-deleted flow node.

6. An electronic device, comprising:
one or more processors; and
a storage apparatus configured to store one or more programs,
wherein when executed by the one or more processors, the one or more programs cause the one or more processors to perform:
acquiring a workflow for a product development process, wherein the workflow comprises a plurality of flow nodes;
detecting whether an operation on at least one of the plurality of flow nodes is a preset operation, and updating the workflow when the operation is determined as the preset operation; and
triggering a target control, using the updated workflow as a target workflow, and storing the target workflow as a template;
wherein detecting whether the operation on the at least one of the plurality of flow nodes is the preset operation, and updating the workflow when the operation is determined as the preset operation comprises:
detecting whether association role information or visual node information in node attribute information corresponding to a current flow node is modified, and determining a to-be-deleted flow node associated with the modified association role information or modified visual node information when the association role information or visual node information is determined to be modified; and
deleting the to-be-deleted flow node of the workflow to update the workflow;
wherein the visual node information is information about visible flow nodes.

7. The electronic device according to claim 6, wherein the one or more programs cause the one or more processors to perform acquiring the workflow by:
determining the workflow from a plurality of to-be-selected workflows according to a preset configuration field.

8. The electronic device according to claim 6, wherein the one or more programs cause the one or more processors to perform, detecting whether the operation on the at least one flow node is the preset operation, and updating the workflow when the operation is determined as the preset operation by:
detecting whether a trigger operation on a current flow node of the plurality of flow nodes is a delete operation, and deleting the current flow node and updating the workflow when the trigger operation is determined as the delete operation.

9. The electronic device according to claim 6, wherein the one or more programs cause the one or more processors to perform, detecting whether the association role information or the visual node information in the node attribute information corresponding to the current flow node is modified, and determining the to-be-deleted flow node associated with the modified association role information or modified visual node information when the association role information or visual node information is determined to be modified by:
detecting whether the association role information in the node attribute information is deleted, and determining the to-be-deleted flow node associated with the deleted association role information when the association role information in the node attribute information is deleted; or
detecting whether content corresponding to the visual node information in the node attribute information is deleted, and determining the to-be-deleted flow node associated with the deleted content when the content is deleted.

10. The electronic device according to claim 6, wherein the one or more programs cause the one or more processors to perform determining the to-be-deleted flow node associated with the modified association role information or modified visual node information when the association role information or visual node information is determined to be modified by:
using the current flow node as a master node, searching downward from the plurality of flow nodes for a flow node dependent on the master node, and using the flow node as the to-be-deleted flow node.

11. A non-transitory storage medium comprising computer-executable instructions that, when executed by a computer processor, cause the computer processor to perform:
acquiring a workflow for a product development process, wherein the workflow comprises a plurality of flow nodes;
detecting whether an operation on at least one of the plurality of flow nodes is a preset operation, and updating the workflow when the operation is determined as the preset operation; and
triggering a target control, using the updated workflow target workflow, and storing the target workflow as a template;
wherein detecting whether the operation on the at least one of the plurality of flow nodes is the preset operation, and updating the workflow when the operation is determined as the preset operation comprises:
detecting whether association role information or visual node information in node attribute information corresponding to a current flow node is modified, and determining a to-be-deleted flow node associated with the modified association role information or modified visual node information when the association role information or visual node information is determined to be modified; and
deleting the to-be-deleted flow node of the workflow to update the workflow;
wherein the visual node information is information about visible flow nodes.

12. The storage medium according to claim 11, wherein the computer-executable instructions, when executed by the computer processor, cause the computer processor to perform acquiring the workflow by:
determining the workflow from a plurality of to-be-selected workflows according to a preset configuration field.

13. The storage medium according to claim 11, wherein the computer-executable instructions, when executed by the computer processor, cause the computer processor to perform, detecting whether the operation on the at least one flow node is the preset operation, and updating the workflow when the operation is determined as the preset operation by:

detecting whether a trigger operation on a current flow node of the plurality of flow nodes is a delete operation, and deleting the current flow node and updating the workflow when the trigger operation is determined as the delete operation.

14. The storage medium according to claim 11, wherein the computer-executable instructions, when executed by the computer processor, cause the computer processor to perform, detecting whether the association role information or the visual node information in the node attribute information corresponding to the current flow node is modified, and determining the to-be-deleted flow node associated with the modified association role information or modified visual node information when the association role information or visual node information is determined to be modified by:

detecting whether the association role information in the node attribute information is deleted, and determining the to-be-deleted flow node associated with the deleted association role information when the association role information in the node attribute information is deleted; or     detecting whether content corresponding to the visual node information in the node attribute information is deleted, and determining the to-be-deleted flow node associated with the deleted content when the content is deleted.

15. The storage medium according to claim 11, wherein the computer-executable instructions, when executed by the computer processor, cause the computer processor to perform determining the to-be-deleted flow node associated with the modified association role information or modified visual node information when the association role information or visual node information is determined to be modified by:

using the current flow node as a master node, searching downward from the plurality of flow nodes for a flow node dependent on the master node, and using the flow node as the to-be-deleted flow node.

\* \* \* \* \*